United States Patent
Chen et al.

(10) Patent No.: US 9,442,764 B2
(45) Date of Patent: *Sep. 13, 2016

(54) ALLOCATING A GLOBAL RESOURCE TO CONSUMERS ACROSS DIFFERENT REGIONS OF A DISTRIBUTED GRID ENVIRONMENT BASED ON USE DATA AND DEMAND DATA OF EACH CONSUMER

(71) Applicant: International Business Machines Corporation, Armonk, NY (US)

(72) Inventors: Chong Chen, Richmond Hill (CA); Zhaohui Ding, Beijing (CN); Zhe Jin, Beijing (CN); Ajith Shanmuganathan, Markham (CA); Michael J. Spriggs, Toronto (CA); Qi Wang, Markham (CA); Chun Liang Yuan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,985

(22) Filed: Jun. 20, 2014

(65) Prior Publication Data

US 2015/0277983 A1   Oct. 1, 2015

Related U.S. Application Data

(63) Continuation of application No. 14/225,603, filed on Mar. 26, 2014.

(51) Int. Cl.
*G06F 9/50* (2006.01)
*G06F 9/48* (2006.01)

(52) U.S. Cl.
CPC ........... *G06F 9/5011* (2013.01); *G06F 9/4881* (2013.01); *G06F 9/5072* (2013.01)

(58) Field of Classification Search
None
See application file for complete search history.

(56) References Cited

U.S. PATENT DOCUMENTS 7,774,457 B1   8/2010   Talwar et al.
7,861,246 B2   12/2010  Lu et al.
7,958,511 B1   6/2011   Pomerantsev et al.

(Continued)

OTHER PUBLICATIONS

Ali, Arshad, et al.; Predicting the Resource Requirements of a Job Submission; Proceedings of the Conference on Computing in High Energy and Nuclear Physics; 2004.

(Continued)

*Primary Examiner* — Abdullah Al Kawsar
*Assistant Examiner* — Jorge A Chu Joy-Davila
(74) *Attorney, Agent, or Firm* — James L. Baudino (57) ABSTRACT

A technique for allocating a global resource in a distributed grid environment includes: receiving from slave resource managers use and demand data associated with the global resource by each consumer in a respective region; compute an allocation of the resource for each consumer and for each region by determining a total amount of the resource to allocate, estimating a need by each consumer for the resource based on the use and demand data, determining an allocation of the total amount of the resource among the consumers based on the estimated need; subdividing the allocation for each consumer among each region where the consumer utilizes the resource; and computing a total allocation of the resource for each region; and communicating to each slave resource manager an amount of the resource allocated to each consumer in each respective region and the total allocation of the resource for the region.

7 Claims, 6 Drawing Sheets

(56) References Cited

U.S. PATENT DOCUMENTS

| | | | |
|---|---|---|---|
| 8,255,915 B1* | 8/2012 | Blanding | G06F 9/5027 709/223 |
| 8,275,881 B2 | 9/2012 | Fellenstein et al. | |
| 2005/0235289 A1* | 10/2005 | Barillari | G06F 9/50 718/100 |
| 2007/0198984 A1* | 8/2007 | Favor | G06F 9/3836 718/104 |
| 2008/0155100 A1* | 6/2008 | Ahmed | G06F 9/5011 709/226 |
| 2008/0229319 A1 | 9/2008 | Marchand | |
| 2011/0161973 A1 | 6/2011 | Klots et al. | |
| 2012/0297056 A1 | 11/2012 | Lee et al. | |
| 2013/0073724 A1* | 3/2013 | Parashar | G06F 9/5072 709/224 |
| 2013/0174175 A1 | 7/2013 | Bachar et al. | |

OTHER PUBLICATIONS

Bhatia, Manjot, et al.; Resource Requirement Prioritized Grid Scheduling Model; 2011 International Conference on Emerging Trends in Networks and Computer Communications (ETNCC); Apr. 2011.

Soundararajan, Gokul, et al.; Dynamic Global Resource Allocation in Shared Data Centers and Clouds; Proceedings of the 2012 Conference of the Center for Advanced Studies on Collaborative Research; 2012.

* cited by examiner

ALLOCATING A GLOBAL RESOURCE TO CONSUMERS ACROSS DIFFERENT REGIONS OF A DISTRIBUTED GRID ENVIRONMENT BASED ON USE DATA AND DEMAND DATA OF EACH CONSUMER

BACKGROUND

In cluster computing, a compute cluster is a set of computers connected over a network with resource usage within the cluster coordinated by a workload manager. Typically, a user submits a job (a request to run an instance of an application) to the workload manager. The resources required to run the job are specified by the user with the job submission. The workload manager assigns idle resources to the job when available, and runs the job.

In some environments, multiple compute clusters may be located in different parts of the world. The workload of each compute cluster may be managed by a workload scheduler that runs local to the cluster. In some cases, a resource may be shared among multiple independent clusters. For example, an organization may purchase a number of floating software licenses from a software vendor. Each license permits the organization to run an instance of an application. Thus, certain resources may need to be allocated according to some defined limit across the different compute clusters of the organization. In some instances, a static allocation per consumer/user may be used. This method imposes a limit on the amount of the resource that can be used for certain compute clusters such that the sum of the limits does not exceed the total amount of the resource. The local workload manager may be responsible for enforcing these limits. If there is a requirement to distribute fairly among consumers/users, then the amount of the resource that each consumer can use may be limited/apportioned. When a region/consumer is not using its assigned amount, the resources may remain idle.

In some environments, resources may be distributed among a number of consumers/users according to a configured resource sharing policy. In this scenario, a user may define a set of resources (usually, a set of hosts) that is to be shared. The user also configures a hierarchy (i.e. a rooted tree) with consumers at leaves of the tree. Each non-root node also has an associated share. Periodically, the resources may be reallocated among the consumers. In doing so, an estimate of the need of each consumer (which is computed by the software that manages the consumer) may be obtained and the resource is distributed among the consumers according to the configured sharing policy.

BRIEF SUMMARY

According to one aspect of the present disclosure a method and technique for allocating a global resource in a distributed grid environment is disclosed. The method includes: receiving, by a master resource manager from each of a plurality of slave resource managers each configured to allocate a global resource within a respective region of a distributed grid computing environment, use data and demand data associated with the global resource by each consumer in the respective region; computing, by the master resource manager, an allocation of the global resource for each consumer and for each region by: determining a total amount of the global resource to allocate; estimating a need by each consumer for the global resource based on the use data and the demand data; determining an allocation of the total amount of the global resource among the consumers based on the estimated need; subdividing the allocation for each consumer among each region where the consumer utilizes the global resource; and computing a total allocation of the global resource for each region; and communicating, by the master resource manager to each slave resource manager, an amount of the global resource allocated to each consumer in each respective region controlled by a respective slave resource manager and the total allocation of the global resource for the region controlled by the respective slave resource manager.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for allocating a global resource in a distributed grid environment. Embodiments of the present disclosure are configured to allocate global resources among consumers and regions in a grid computing environment. A master resource manager is fed global resource usage and demand for each region, and this master resource manager sends allocation decisions for the global resource to the resource managers in each respective region. The master resource manager computes an allocation of a global resource for each region by determining a total amount of global resource to distribute, estimating the need of the global resource of each consumer in a particular region, allocating the global resource among the consumers of a particular region, subdividing a consumer's allocation among the different regions where the consumer utilizes the global resource, and computing the total allocation of the global resource for a particular region. Thus, for example, in some embodiments, the method and technique includes: receiving, by a master resource manager from each of a plurality of slave resource managers each configured to allocate a global resource within a respective region of a distributed grid computing environment, use data and demand data associated with the global resource by each consumer in the respective region; computing, by the master resource manager, an allocation of the global resource for each consumer and for each region by: determining a total amount of the global resource to allocate; estimating a need by each consumer for the global resource based on the use data and the demand data; determining an allocation of the total amount of the global resource among the consumers based on the estimated need; subdividing the allocation for each consumer among each region where the consumer utilizes the global resource; and computing a total allocation of the global resource for each region; and communicating, by the master resource manager to each slave resource manager, an amount of the global resource allocated to each consumer in each respective region controlled by a respective slave resource manager and the total allocation of the global resource for the region controlled by the respective slave resource manager.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
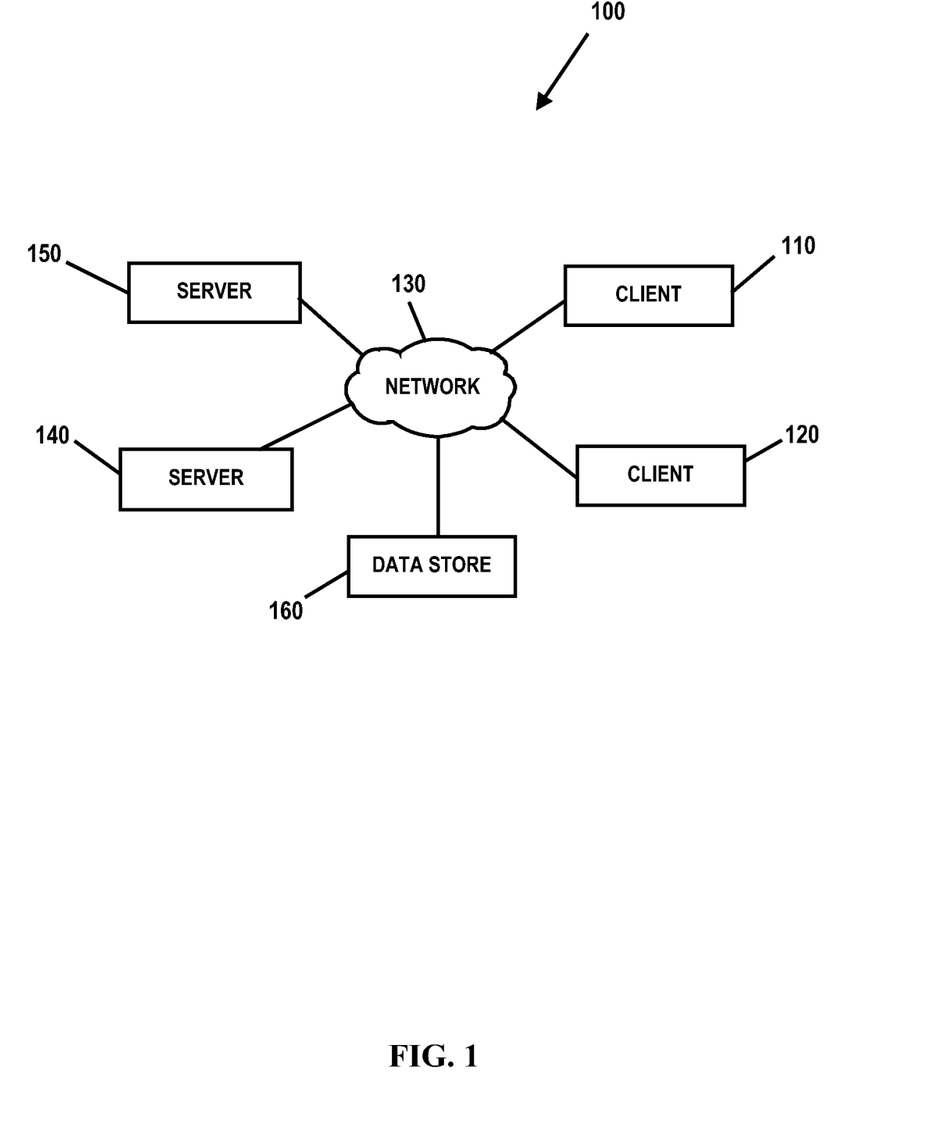
FIG. 1 is an embodiment of a network of data processing systems in which the illustrative embodiments of the present disclosure may be implemented.
Figure 2:
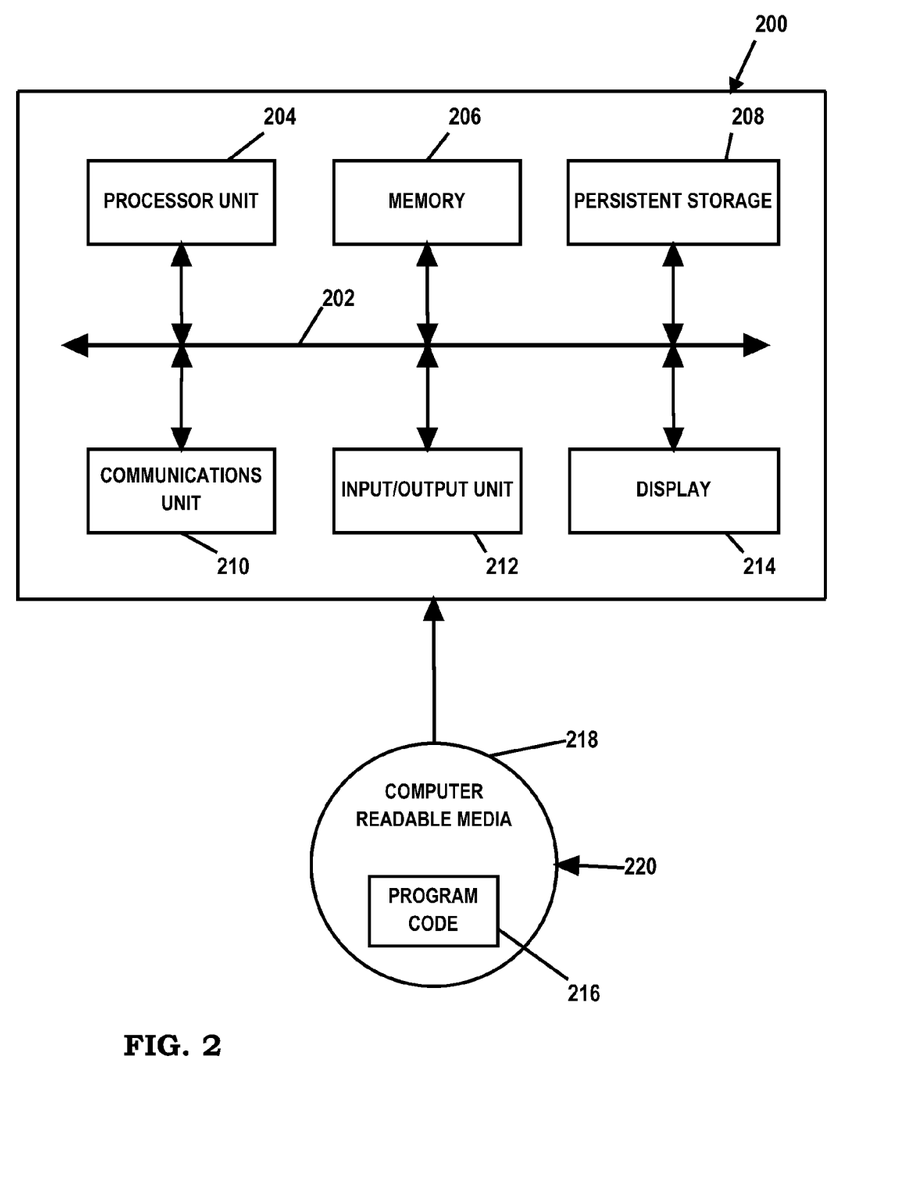
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for allocating a global resource in a distributed grid environment according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212.

The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
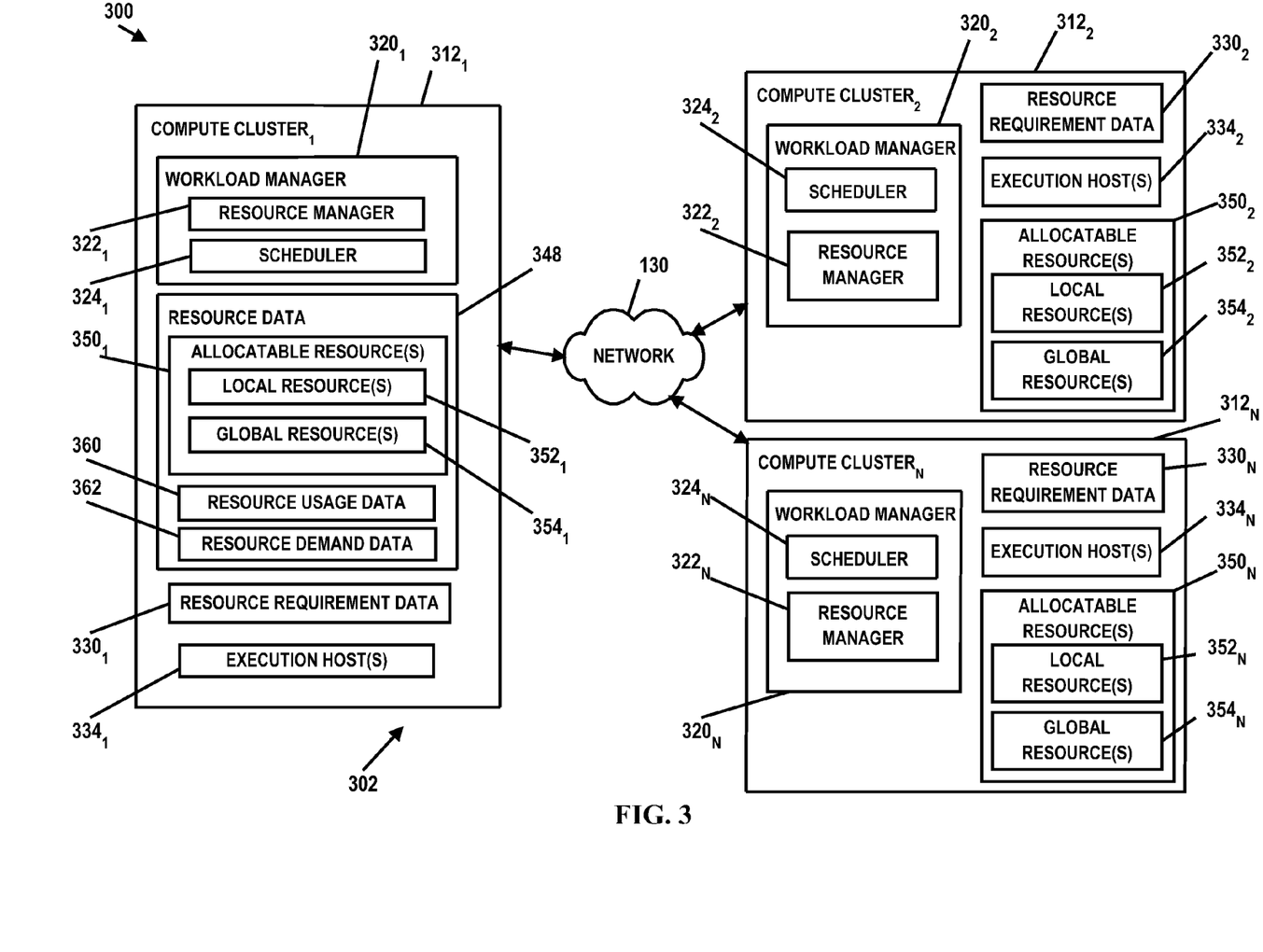
FIG. 3 is a diagram illustrating an embodiment of a distributed grid computing environment in which illustrative embodiments of a system for allocating a global resource in a distributed grid environment according to the present disclosure may be implemented.

FIG. 3 is an illustrative embodiment of a system 300 for cluster computing within a distributed grid environment and the allocation of global resources across the grid environment. Various components of system 300 may be implemented on data processing systems or platforms such as, but not limited to, servers 140 and/or 150, clients 110 and/or 120, or at other data processing system locations. In FIG. 3, system 300 illustrates an exemplary grid architecture 302 where a plurality of compute clusters are configured to communicate with one another and/or share resources across the grid. Each cluster may include a plurality of linked machines or "hosts" which are configured to provide resources such as CPU time, database storage, software licenses, and computing capabilities. A host may be any machine capable of providing resources, such as a personal computer (PC), a server, or other type of computing device.

In the embodiment illustrated in FIG. 3, system 300 includes compute clusters 312 (e.g., compute clusters $312_1$-$312_n$). Each compute cluster 312 may comprise a single host or multiple hosts and is configured to receive jobs from one or more clients or users. Each job may specify or may require certain resource requirements. Each compute cluster 312 may comprise a workload manager 320 that receives/evaluates submitted jobs and performs various resource scheduling and allocation decisions for executing/processing the jobs (e.g., workload managers $320_{1-n}$ on respective compute clusters $312_{1-n}$). For example, in the embodiment illustrated in FIG. 3, each workload manager $320_{1-n}$ may include a resource manager $322_{1-n}$ and a scheduler $324_{1-n}$, respectively. Scheduler 324 may be used for scheduling the execution and/or processing of jobs, and resource manager 322 may allocate resources to the particular job. For example, each job may require certain resources (e.g., a certain number of servers, particular operating system, certain licensed software applications, memory capacity, particular processor or CPU capabilities, require a certain number of job slots, etc.). In the illustrated embodiment, each compute cluster 312 may include resource requirement data 330 (e.g., data $330_{1-n}$ on respective compute clusters $312_{1-n}$). Resource requirement data 330 may comprise information regarding the resource requirements for particular jobs. Resource manager 322 performs various resource matching evaluations based on the resource requirements of the different jobs and the cluster resource attributes and availability to process the jobs. Workload manager 320 may be implemented in any suitable manner using known techniques that may be hardware-based, software-based, or some combination of both. For example, workload manager 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the context of this disclosure, a "consumer" or "user" may comprise an entity that uses resources. For example, a consumer may represent an individual person or group, a business unit, a project, an application, etc. A "region" may comprise the logical (or physical) location in which resources are used. In some environments, communication latency is smaller within a region compared to latency between regions. Moreover, resource usage within a region is managed largely independently of other regions. For example, a region may comprise a set of computers connected on a LAN, with resources managed by a single workload manager 320 (i.e., a compute cluster 312). A consumer may potentially use resources in multiple regions. A "local resource" is a resource that is tied to a single region. Such a resource is used within its region (e.g., CPUs, memory, storage, and software licenses tied to hosts within the particular compute cluster 312). A "global resource" is a resource that is not tied to a particular region, but rather can be used in any region (e.g., floating software licenses).

As described above, each compute cluster 312 includes one or more execution hosts 334 each configured with or made available to various local and global resource attributes. Resource managers 322 may collect and/or otherwise gather resource attribute information associated with the various execution hosts 334 of the respective compute cluster 312 and allocate resources for processing jobs.

Figure 4:
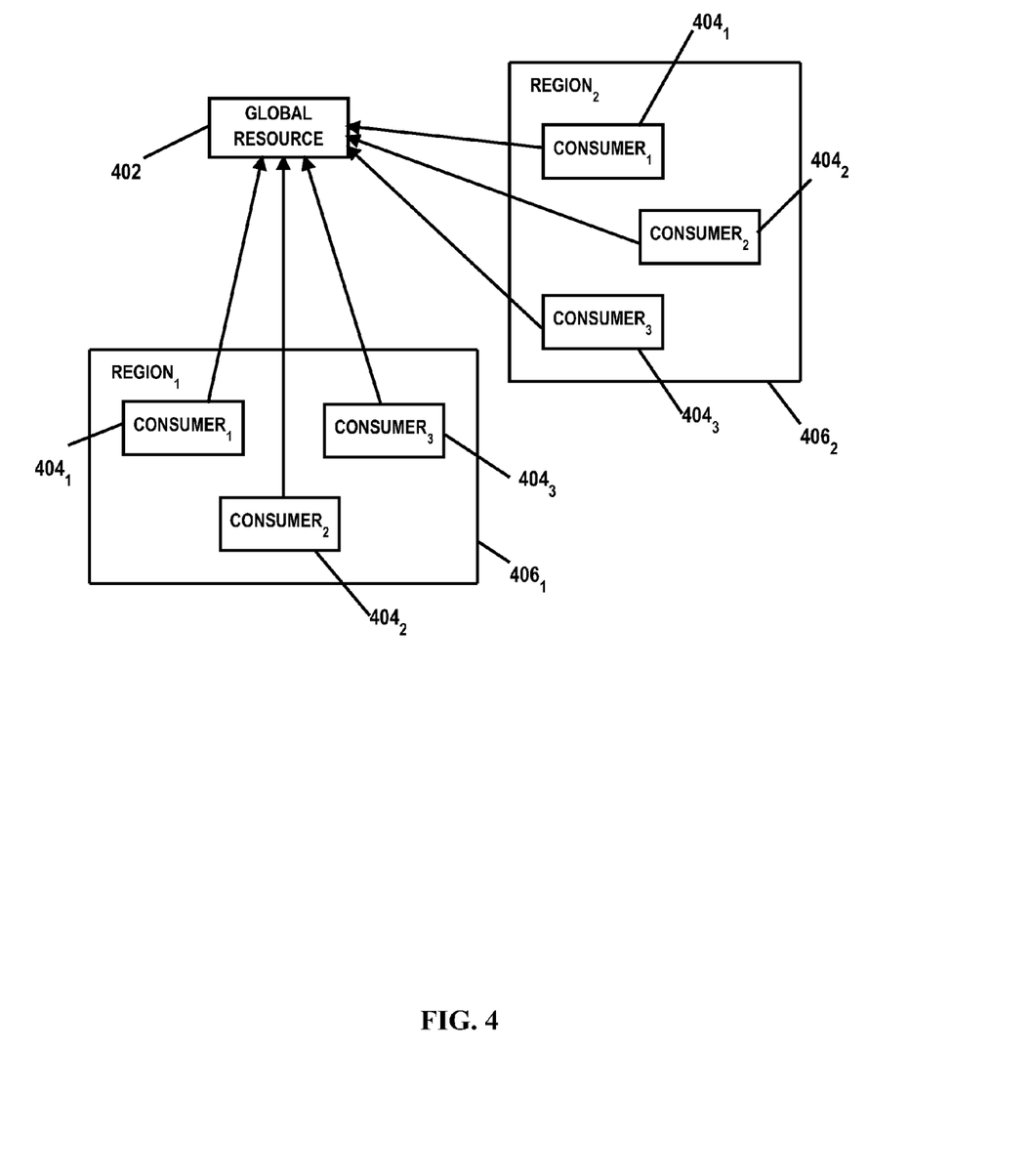
FIG. 4 is a diagram illustrating utilization of a global resource by consumers spanning across multiple regions according to the present disclosure.

Referring to FIG. 4, utilization of a global resource by consumers in different regions is illustrated. In FIG. 4, a global resource 402 is shared and/or distributed among consumers 404 (e.g., consumers $404_{1-3}$) located in two different regions 406 (e.g., regions $406_1$ and $406_2$). As discussed above, some consumers may use resources in multiple regions.

Embodiments of the present disclosure distribute a global resource among consumers in various regions. For example, each consumer can potentially appear in multiple regions. Embodiments of the present disclosure define and/or limit the use of a global resource across multiple regions at any point in time, thereby avoiding over-committing the global resource (e.g., preventing the consumers as a whole to attempt to use more of the resource than exists). For example, in the case of floating software licenses, it is undesirable for consumers to attempt to use more licenses than are available. If an application is launched and insufficient licenses are available, then the application may fail. Alternatively, the application may queue itself up and wait for licenses to become available. While waiting, the application may perform no useful work but yet occupies resources, such as CPUs and memory. Embodiments of the present disclosure enable sharing the resource in a fair manner among consumers (e.g., ensuring that each consumer has access to a specified portion of the resource when needed). However, when a consumer does not need its share of the resource, the present disclosure enables this share to be used by other consumers. Embodiments of the present disclosure also minimize communications between regions. For example, regions may represent datacenters on opposite sides of the world. Since communication latency may be high between regions, each region preferably operates relatively autonomously, enabling resources to be quickly reallocated among consumers within the particular region in response to changing demand.

As described above, workload manager 320 matches jobs to resources. The resources may be local resources (e.g., CPUs, memory, and JO bandwidth) as well as global resources (e.g., floating licenses). For example, suppose that consumer submits 1000 jobs to the workload manager 320 within a particular region 406. Each job may require one license. There may be only enough resources in the region to concurrently run 100 jobs. In this case, there is no point in allocating 1000 licenses to this consumer as the real need is much less. Those additional licenses could potentially have gone to supply another region, thereby improving utilization of the resource thereby. Even if the region has capacity to run 1000 jobs concurrently, the consumer that has submitted the jobs may not be able to run 1000 jobs concurrently because it must share resources local to the region with other consumers. Timing conditions pose another challenge. For example, by the time resources have been reassigned to a consumer, the need of that consumer may have already decreased as jobs of that consumer have been dispatched in the meantime.

Figure 5:
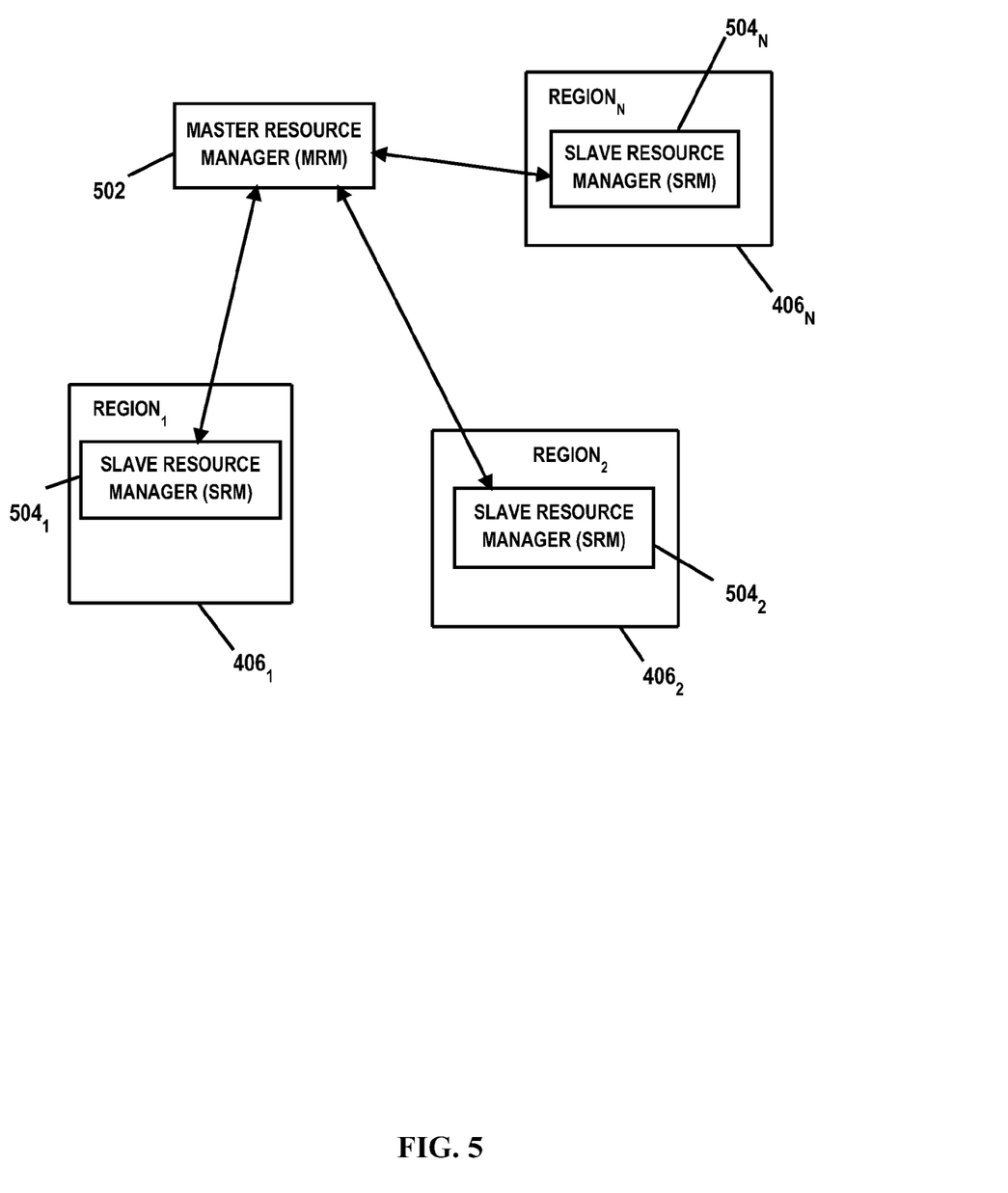
FIG. 5 is a diagram illustrating a resource manager architecture between different regions of a grid computing environment according to the present disclosure.

According to the present disclosure, one resource manager 322 is configured to allocate global resources among consumers and regions. This resource manager 322 is fed global resource usage and demand for each region, and this resource manager 322 sends allocation decisions for the global resource to the resource managers in each respective region. FIG. 5 is a diagram illustrating a relationship between resource managers for different regions. In FIG. 5, one resource manager (e.g., one of resource managers 322 of FIG. 3) is designated as a "master" resource manager ("MRM") 502, while other resource managers not designated as the MRM are designated as "slave" resource managers ("SRM") 504 (e.g., SRMs $504_{1-n}$). The MRM 502 distributes amounts of the global resource among the various regions $406_{1-n}$. The MRM 502 may either be run as a standalone server or built into a workload manager of a certain compute cluster 312 (e.g., compute cluster $312_1$). The SRMs $504_{1-n}$ manage the global resources within a respective region 406. The SRMs $504_{1-n}$ could be a component built into a respective workload manager 320 or as a standalone daemon running within the same region 406 that communicates with workload managers within the region 406 to control the use of the global resources within the particular region 406.

Thus, by way of example, referring to FIG. 3, consider that resource manager $322_1$ is designated as a MRM. The MRM $322_1$ distributes amounts of the global resource among the various regions. Resource managers 322 not designated as the MRM $322_1$ may be designated as SRMs (e.g., resource managers $322_{2-n}$).

As an illustrative example, consider that compute clusters $312_{1-n}$ depicted in FIG. 3 are each within a different region. Each region may have certain allocatable resources 350 (e.g., resources $350_{1-n}$ for respective compute clusters $312_{1-n}$). Each compute cluster 312 may comprise resource data 348 (illustrated only in compute cluster $312_1$ of FIG. 3) in the form of allocatable resources 350, which may include local resources 352 and global resources 354. Each SRM $322_{2-n}$ periodically sends MRM $322_1$ the amount of a global resource that is currently in use by each consumer within the respective region and the additional amount of the global resource that is required by each consumer in the particular region. In FIG. 3, this information is represented as resource usage data 360 and resource demand data 362. Allocation messages are sent from MRM $322_1$ to each SRM $322_{2-n}$ informing the SRM $322_{2-n}$ as to the amount of the global resource to allocate for particular consumers in a regions and the region as a whole.

Periodically, the amount of a global resource allowed for each consumer within the region, as well as for the region as a whole, are sent from MRM $322_1$ to each SRM $322_{2-n}$. In some embodiments, these messages may be sent or triggered in response to a usage or demand update for a global resource from a particular SRM $322_{2-n}$. An acknowledgement message is then sent by each respective SRM $322_{2-n}$ to the MRM $322_1$ in response to receipt of an allocation message. When the MRM $322_1$ receives this acknowledgement, the MRM $322_1$ operates based on the respective SRM $322_{2-n}$ enforcing the most recent allocation sent to that SRM $322_{2-n}$ within its respective region. This message exchange may be configured to occur periodically (e.g., setting the period sufficiently large (e.g. to several seconds or more) to keep communication costs low between the MRM and SRMs, which may reside in different regions).

In operation, each SRM $322_{2-n}$ is configured to track global resource use and demand within its region per consumer, and periodically send this information to the MRM $322_1$. The SRM $322_{2-n}$ also receives allocation messages from the MRM $322_1$ and enforces these received allocations within its region to limit global resource use within its region per consumer, limit global resource use within its region as a whole, and send acknowledgement messages back to the MRM $322_1$ for received allocations.

Each SRM calculates global resource use and demand from the consumers within its region. For example, for each consumer C in region R and for each global resource, the message sent to the MRM may include: 1) DEMAND(C,R); and 2) USE(C,R). DEMAND(C,R) is an estimate of demand from consumer C in region R for the global resource. As indicated above, DEMAND(C,R) is an estimate of the amount of the global resource that could potentially be used by the consumer immediately assuming no other restrictions on the consumer (e.g., lack of other resources such as CPUs). Such an estimate can be computed by summing all pending jobs of C in R for the global resource. USE(C,R) is a measure of global resource usage by consumer C in region R. For example, USE(C,R) may comprise a snapshot of the amount of a global resource currently in use at the time that the message is sent by the SRM to the MRM. In some embodiments, USE(C,R) may be a peak concurrent use of the global resource by C in R within the recent past or based on some smoothing function such as exponential smoothing. Alternatively, each SRM could send the MRM job start and finish events. In this case, USE(C,R) can be tracked on the MRM side.

The MRM periodically sends allocation decisions to each SRM. Allocation decisions may be either triggered by a request from an SRM, or triggered by the MRM itself on periodic basis. The contents of an allocation decision for a particular region R may include: 1) an allocation of the global resource for each consumer C in the region, ALLOC(C,R); 2) an allocation of the global resource for the region as a whole, ALLOC(R); and 3) a timestamp for the allocation decision. ALLOC(R) will be less than or equal to the sum of ALLOC(C,R) summed over all consumers C in a region. Normally, ALLOC(R) will equal the sum of allocations for all consumers in the region. When the MRM reallocates resources between two regions, ALLOC(R) may temporarily be less than this sum. The MRM may reallocate resources between consumers within a particular region and/or spanning across multiple regions.

Once an allocation message is received by a SRM, the SRM sends back an acknowledgement message to the MRM that includes the timestamp. Once this acknowledgement is sent, the SRM enforces the global resource allocation decision by the MRM. Initially, when a region receives an allocation, some consumers may initially exceed this allocation. In some embodiments, any consumer that already exceeds its allocation of the global resource may be disallowed from increasing its use of the global resource within the region. Similarly, the region as a whole may initially exceed its global resource allocation. When this happens, no consumer should be able to use additional amounts of the global resource in the region. Over time, the SRM ensures that eventually the use by each consumer and by the region as a whole decreases to within the allocated amounts as instructed by the MRM (e.g., by waiting for jobs to finish).

In some embodiments, the MRM computes an allocation of a global resource for a region by: 1) determining a total amount of global resource to distribute; 2) estimating the need of the global resource of each consumer; 3) allocating the global resource among consumers; 4) subdividing consumers' allocations among regions; and 5) computing the total allocation for a region.

Determining a total amount of the global resource to distribute may be performed by calculating the TOTAL amount of the global resource that is to be allocated among consumers and regions. In the case of an administrator-defined limit, this TOTAL may be a preconfigured number. In the case of licenses, this TOTAL may be the total number of licenses that can be used in the system 300, which may for example be obtained by polling license management software.

To estimate the need of the global resource of each consumer, each SRM periodically updates the MRM with a measure of global resource usage of each consumer C within its region R (e.g., USE(C,R)) and an estimate of the demand for additional resources (e.g., DEMAND(C,R)). To derive an overall measure of usage of the global resource by a consumer C, the MRM sums the usage of the global resource for the consumer over all regions (USE(C) denotes this sum). To determine an overall estimate of demand for additional amounts of the global resource by C, the MRM sums DEMAND(C,R) over all regions (DEMAND(C) denotes the sum).

For allocating the global resource among consumers, the estimate of demand for the global resource in DEMAND(C) may in general overestimate the amount of additional global resources that can be used by C in addition to what is already being used. Thus, in some embodiments, the effect that DEMAND(C) can have on the final allocation may be limited and, instead, allocation decisions may be based primarily on USE(C). Thus, a configurable value, DEMAND_LIMIT, is used. DEMAND_LIMIT should be set to be a small value relative to TOTAL. The value of DEMAND_LIMIT limits the step-size by which a consumer's allocation of a global resource can change in each subsequent reallocation by the MRM.

The MRM distributes the TOTAL amount of global resource among consumers in three stages: 1) allocating TOTAL among consumers and limiting each consumer C to at most USE(C)+MIN(DEMAND_LIMIT, DEMAND(C)) (i.e., usage of the global resource for the consumer over all regions plus the lesser of the DEMAND_LIMIT value or the estimate of demand for additional amounts of the global resource by a consumer C over all regions); 2) allocating remaining global resource amounts by limiting each consumer C to at most USE(C)+DEMAND(C); and 3) allocating any further remainder of the global resource with no limit. In each of the foregoing steps, the allocation made is proportional to the configured shares of the consumers. Once this allocation is complete, the TOTAL amount of the resource is allocated among the consumers. For each consumer C, the allocated global resource may be defined as ALLOC(C).

The consumers' allocations among compute clusters is subdivided. For example, once the MRM has determined ALLOC(C) for each consumer C, the MRM determines how to subdivide this allocation among regions spanned by the consumer (i.e., the MRM computes a value for ALLOC(C, R) for each consumer C in each region R. The value for ALLOC(C,R) for each consumer C in each region R may be derived in a similar manner to the way that TOTAL was subdivided among consumers. For example, the shares of the global resource for each region may be equal or be some configured values. Alternatively, a share for each region may be set to be proportional to the estimated need.

The MRM then computes the total allocation of the global resource for a region R (ALLOC(R)) and send this allocation information to the SRM running in that particular region. In some embodiments, this value may be set to the sum of ALLOC(C,R) for all consumers C in R. However, if the MRM is to communicate this allocation to the SRM in region R, the global resource may potentially be overcommitted (e.g., when some amount of the global resource must be transferred between regions). When transferring an amount of the global resource between two regions, the MRM: 1) decreases allocation to one region; 2) waits for acknowledgement from that region; 3) waits for usage to drop in that region; and 4) then increases allocation to the second region.

TARGET(R) may be used to denote the sum of ALLOC(C,R) over all consumers C in region R. ALLOC_ACK(R) may be used to denote the value of the last acknowledged allocation for ALLOC(R) sent from the MRM to the SRM in region R. FREE may be used to denote the TOTAL minus the sum over all regions R of MIN(USE(R), MAX(ALLOC(R), ALLOC_ACK(R)). FREE represents the amount of the global resource that is unused and unallocated. When each region adheres to its acknowledged allocation limits, the FREE amount of the global resource can be allocated to any compute cluster.

The MRM computes a new allocation for region R, ALLOC(R), as follows. If ALLOC(R)>TARGET(R), set ALLOC(R)=TARGET(R). Otherwise, set ALLOC(R) to: MIN(TARGET(R), MAX(ALLOC(R), ALLOC_ACK(R))+FREE). Once this new value for ALLOC(R) is computed by the MRM, the allocation message can be sent to the SRM in region R. When each region adheres to its acknowledged allocation limits, there should be no over-commitment of the global resource.

Figure 6:
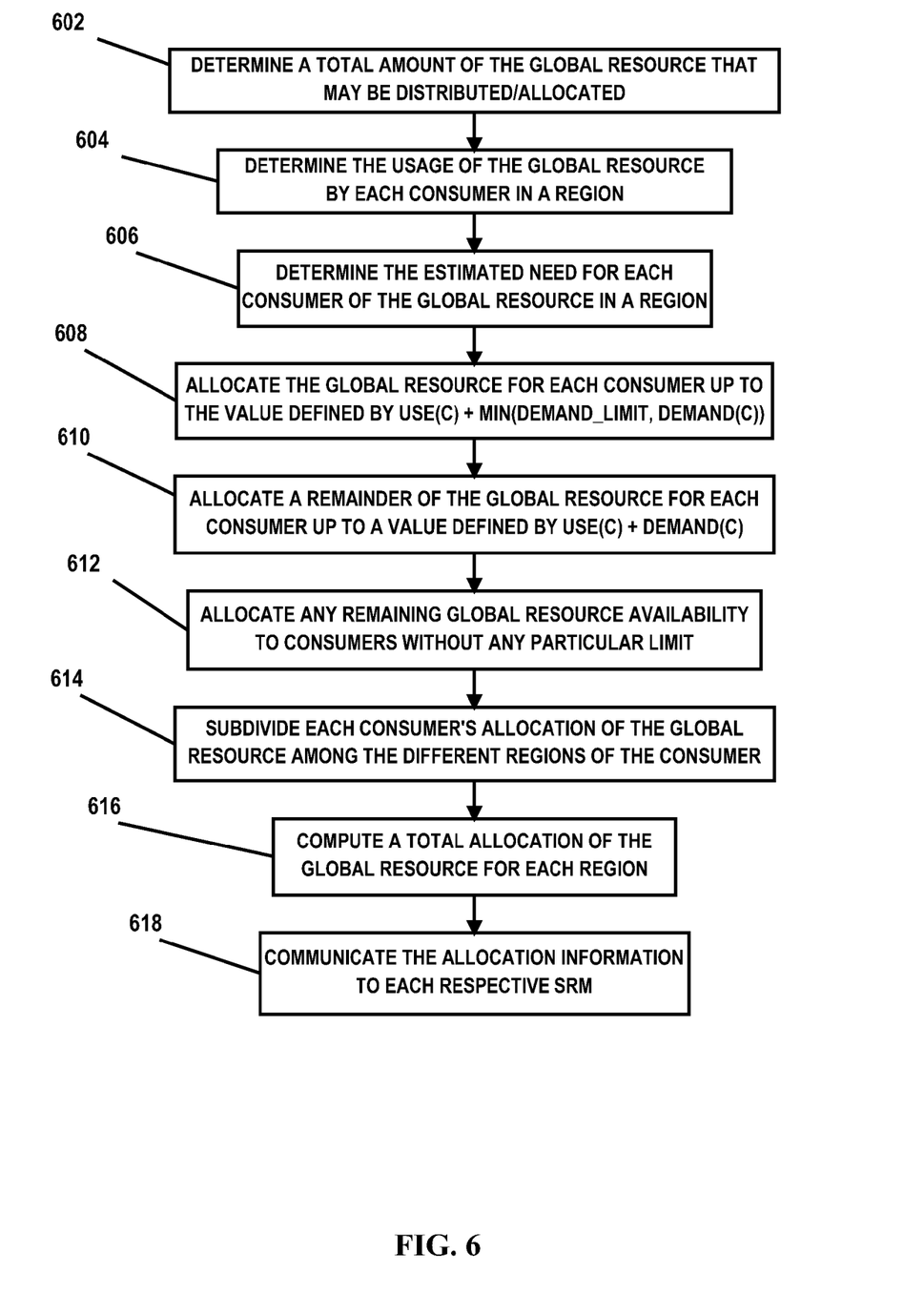
FIG. 6 is a flow diagram illustrating an embodiment of a method for allocating a global resource in a distributed grid environment according to the present disclosure.

FIG. 6 is a flow diagram illustrating an embodiment of a method for allocating a global resource among consumers in different regions. The method begins at block 602, where the MRM determines a total amount of the global resource that may be distributed/allocated. At block 604, the MRM determines the usage of the global resource by each consumer in a region. For example, the MRM may use resource usage data 360 (e.g., USE(C,R)) received by an SRM for each respective region. At block 606, the estimated need for each consumer of the global resource in a region is determined. For example, the MRM may use resource demand data 362 (e.g., DEMAND(C,R)) received by an SRM for each respective region.

At bock 608, the global resource is allocated among consumers by allocating the global resource for each consumer up to the value defined by USE(C)+MIN(DEMAND_LIMIT, DEMAND(C)). At block 610, a remainder of the global resource is allocated for each consumer up to a value defined by USE(C)+DEMAND(C). At block 612, any remaining global resource availability may be allocated to consumers without any particular limit. At block 614, each consumer's allocation of the global resource is subdivided among the different regions of the consumer. At block 616, a total allocation of the global resource is computed for each region. At block 618, the allocation information is communicated to each respective SRM.

Thus, embodiments of the present disclosure are configured to allocate global resources among consumers and regions in a grid computing environment. A master resource manager is fed global resource usage and demand for each region, and this master resource manager sends allocation decisions for the global resource to the resource managers in each respective region. The master resource manager computes an allocation of a global resource for each region by determining a total amount of global resource to distribute, estimating the need of the global resource of each consumer in a particular region, allocating the global resource among the consumers of a particular region, subdividing a consumer's allocation among the different regions where the consumer utilizes the global resource, and computing the total allocation of the global resource for a particular region.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
receiving, by a master resource manager from each of a plurality of slave resource managers each configured to allocate a global resource within a respectively controlled region of a distributed grid computing environment, use data and demand data associated with the global resource by each consumer in the respective region;
computing, by the master resource manager, an allocation of the global resource for each consumer and for each region by:
determining a total amount of the global resource to allocate;
estimating a need by each consumer for the global resource based on the use data and the demand data, wherein the estimated need may reflect the amount of resource that is currently being used and the amount of additional resource that is being demanded;
determining an allocation of the total amount of the global resource among the consumers based on the estimated need;
subdividing the allocation for each consumer among each region where the consumer utilizes the global resource; and
computing a total allocation of the global resource for each region; and
communicating, by the master resource manager to each slave resource manager, an amount of the global resource allocated to each consumer in each respective region controlled by a respective slave resource manager and the total allocation of the global resource for the region controlled by the respective slave resource manager.

2. The method of claim 1, wherein estimating the need by each consumer for the global resource comprises summing the use data and the demand data for each consumer over all regions where the consumer is utilizing the global resource.

3. The method of claim 1, further comprising reallocating the global resource among the consumers in at least one region in response to receiving an update to the use data or the demand data.

4. The method of claim 3, further comprising limiting, by the master resource manager, a step-size of a change of an allocation amount for each consumer for the global resource in the reallocation.

5. The method of claim 4, wherein determining the allocation of the total amount of the global resource among the consumers based on the estimated need comprises limiting the allocation for each consumer to a value representing usage of the global resource by the consumer over all regions where the consumer is utilizing the global resource plus the lesser of the step-size or a demand for the global resource by the consumer over all regions where the consumer utilizes the global resource.

6. The method of claim 5, further comprising:
allocating any remainder of the global resource up to a value representing usage of the global resource by the consumer over all regions where the consumer is utilizing the global resource plus the demand for the global resource by the consumer over all regions where the consumer utilizes the global resource; and allocating any further remainder of the global resource without limit to the consumer.

7. The method of claim 1, further comprising transferring an allocation of the global resource from a first region to a second region by:
- decreasing an allocation of the global resource to the first region;
- awaiting an acknowledgement from a slave resource manager of the first region of the decreased allocation;
- awaiting for usage of the global resource in the first region to decrease; and
- responsive to the usage decreasing in the first region, increasing an allocation of the global resource to the second region.

* * * * *